(12) United States Patent
Harikumar et al.

(10) Patent No.: US 8,102,928 B2
(45) Date of Patent: *Jan. 24, 2012

(54) SPECTRALLY CONSTRAINED IMPULSE SHORTENING FILTER FOR A DISCRETE MULTI-TONE RECEIVER

(75) Inventors: Gopal Harikumar, Waltham, MA (US); Daniel J. Marchok, Buchanan, MI (US)

(73) Assignee: Tellabs Operations, Inc., Naperville, IL (US)

( * ) Notice: Subject to any disclaimer, the term of this patent is extended or adjusted under 35 U.S.C. 154(b) by 550 days.

This patent is subject to a terminal disclaimer.

(21) Appl. No.: 12/238,140

(22) Filed: Sep. 25, 2008

(65) Prior Publication Data

US 2009/0022216 A1    Jan. 22, 2009

Related U.S. Application Data

(63) Continuation of application No. 11/759,789, filed on Jun. 7, 2007, now Pat. No. 7,430,242, which is a continuation of application No. 10/608,329, filed on Jun. 27, 2003, now Pat. No. 7,254,178, which is a continuation of application No. 09/054,468, filed on Apr. 3, 1998, now Pat. No. 6,631,175.

(51) Int. Cl.
*H04L 27/28* (2006.01)
*H04B 1/10* (2006.01)

(52) U.S. Cl. ................................. 375/260; 375/350

(58) Field of Classification Search .................. 375/222, 375/223, 232, 233, 260, 340–343, 350; 370/286
See application file for complete search history.

(56) References Cited

U.S. PATENT DOCUMENTS

| | | | |
|---|---|---|---|
| 3,795,772 A | 3/1974 | Hill et al. |
| 4,184,347 A | 1/1980 | Tobita et al. |
| 4,300,229 A | 11/1981 | Hirosaki |
| 4,351,983 A | 9/1982 | Crouse et al. |
| 4,361,813 A | 11/1982 | Watatani |
| 4,399,329 A | 8/1983 | Wharton |
| 4,425,665 A | 1/1984 | Stauffer |
| 4,535,472 A | 8/1985 | Tomcik |
| 4,618,996 A | 10/1986 | Rafal et al. |
| 4,630,305 A | 12/1986 | Borth et al. |
| 4,731,816 A | 3/1988 | Hughes-Hartogs |
| 4,817,141 A | 3/1989 | Taguchi |
| 4,951,279 A | 8/1990 | Hotta |
| 4,980,897 A | 12/1990 | Decker et al. |

(Continued)

FOREIGN PATENT DOCUMENTS

EP    0 768 778 A1    4/1997

(Continued)

OTHER PUBLICATIONS

Bingham, "Multicarrier Modulation for Data Transmission: An Idea Whose Time has Come," pp. 5-8, 11-14 (1990).

(Continued)

*Primary Examiner* — Don N Vo
(74) *Attorney, Agent, or Firm* — Hamilton, Brook, Smith & Reynolds, P.C.

(57) ABSTRACT

A channel in a multiple carrier communication system is equalized by computing a target spectral response, shortening the impulse response of the channel so that a significant part of an energy of the impulse response is confined to a region that is shorter than a target length and filtering the signal based on the target spectral response.

24 Claims, 6 Drawing Sheets

U.S. PATENT DOCUMENTS

| | | | |
|---|---|---|---|
| 5,001,724 A | 3/1991 | Birgenheier et al. | |
| 5,014,306 A | 5/1991 | Rodgers et al. | |
| 5,077,727 A | 12/1991 | Suzuki | |
| 5,103,459 A | 4/1992 | Gilhousen et al. | |
| 5,228,025 A | 7/1993 | LeFloch et al. | |
| 5,235,621 A | 8/1993 | Amir-Alikhani | |
| 5,253,270 A | 10/1993 | Petit | |
| 5,285,474 A | 2/1994 | Chow et al. | |
| 5,323,255 A | 6/1994 | Sierens et al. | |
| 5,416,767 A | 5/1995 | Koppelaar et al. | |
| 5,416,801 A | 5/1995 | Chouly et al. | |
| 5,461,640 A | 10/1995 | Gatherer | |
| 5,471,464 A | 11/1995 | Ikeda | |
| 5,479,447 A | 12/1995 | Chow et al. | |
| 5,483,529 A | 1/1996 | Baggen et al. | |
| 5,499,271 A | 3/1996 | Plenge et al. | |
| 5,502,749 A | 3/1996 | Ozaki | |
| 5,521,908 A | 5/1996 | Younce et al. | |
| 5,524,001 A | 6/1996 | Beaudry et al. | |
| 5,539,777 A | 7/1996 | Grube et al. | |
| 5,548,819 A | 8/1996 | Robb | |
| 5,553,064 A | 9/1996 | Paff et al. | |
| 5,557,612 A | 9/1996 | Bingham | |
| 5,559,789 A | 9/1996 | Nakano et al. | |
| 5,566,209 A | 10/1996 | Forssen et al. | |
| 5,568,483 A | 10/1996 | Padovani et al. | |
| 5,594,757 A | 1/1997 | Rohani | |
| 5,596,582 A | 1/1997 | Sato et al. | |
| 5,602,835 A | 2/1997 | Seki et al. | |
| 5,603,081 A | 2/1997 | Raith et al. | |
| 5,608,725 A | 3/1997 | Grube et al. | |
| 5,608,764 A | 3/1997 | Sugita et al. | |
| 5,610,908 A | 3/1997 | Shelswell et al. | |
| 5,621,730 A | 4/1997 | Kelley | |
| 5,625,651 A | 4/1997 | Cioffi | |
| 5,627,863 A | 5/1997 | Aslanis et al. | |
| 5,636,246 A | 6/1997 | Tzannes et al. | |
| 5,675,572 A | 10/1997 | Hidejima et al. | |
| 5,675,608 A | 10/1997 | Kim et al. | |
| 5,682,376 A | 10/1997 | Hayashino et al. | |
| 5,684,920 A | 11/1997 | Iwakami et al. | |
| 5,687,165 A | 11/1997 | Daffara et al. | |
| 5,703,873 A | 12/1997 | Ojanpera et al. | |
| 5,708,662 A | 1/1998 | Takashima | |
| 5,726,978 A | 3/1998 | Frodigh et al. | |
| 5,732,068 A | 3/1998 | Takahashi et al. | |
| 5,774,450 A | 6/1998 | Harada et al. | |
| 5,778,001 A | 7/1998 | Nakayama et al. | |
| 5,786,844 A | 7/1998 | Rogers et al. | |
| 5,790,514 A | 8/1998 | Marchok et al. | |
| 5,790,516 A | 8/1998 | Gudmundson et al. | |
| 5,790,554 A | 8/1998 | Pitcher et al. | |
| 5,790,615 A | 8/1998 | Beale et al. | |
| 5,796,820 A | 8/1998 | Sasada | |
| 5,812,523 A | 9/1998 | Isaksson et al. | |
| 5,815,488 A | 9/1998 | Williams et al. | |
| 5,828,710 A | 10/1998 | Beale | |
| 5,841,813 A | 11/1998 | Van Nee | |
| 5,850,444 A | 12/1998 | Rune | |
| 5,862,007 A | 1/1999 | Pham et al. | |
| 5,867,764 A | 2/1999 | Williams | |
| 5,870,432 A | 2/1999 | Kerckhove | |
| 5,909,465 A | 6/1999 | Bottomley et al. | |
| 5,912,920 A | 6/1999 | Marchok et al. | |
| 5,936,961 A | 8/1999 | Chiodini et al. | |
| 5,949,796 A | 9/1999 | Kumar | |
| 5,984,514 A | 11/1999 | Greene et al. | |
| 5,995,483 A | 11/1999 | Marchok et al. | |
| 5,995,568 A | 11/1999 | Molnar et al. | |
| 6,002,722 A | 12/1999 | Wu | |
| 6,018,317 A | 1/2000 | Dogan et al. | |
| 6,023,674 A | 2/2000 | Mekuria | |
| 6,028,891 A | 2/2000 | Ribner et al. | |
| 6,035,000 A | 3/2000 | Bingham | |
| 6,044,107 A | 3/2000 | Gatherer et al. | |
| 6,047,020 A | 4/2000 | Hottinen | |
| 6,055,575 A | 4/2000 | Paulsen et al. | |
| 6,061,796 A | 5/2000 | Chen et al. | |
| 6,069,917 A | 5/2000 | Werner et al. | |
| 6,072,782 A | 6/2000 | Wu | |
| 6,073,176 A | 6/2000 | Baindur et al. | |
| 6,073,179 A | 6/2000 | Liu et al. | |
| 6,075,816 A | 6/2000 | Werner et al. | |
| 6,079,020 A | 6/2000 | Liu | |
| 6,091,932 A | 7/2000 | Langlais | |
| 6,097,763 A | 8/2000 | Djokovic et al. | |
| 6,101,230 A | 8/2000 | Chun et al. | |
| 6,108,349 A | 8/2000 | Marchok et al. | |
| 6,108,610 A | 8/2000 | Winn | |
| 6,118,758 A | 9/2000 | Marchok et al. | |
| 6,122,246 A | 9/2000 | Marchok et al. | |
| 6,125,150 A | 9/2000 | Wesel et al. | |
| 6,128,276 A | 10/2000 | Agee | |
| 6,134,591 A | 10/2000 | Nickles | |
| 6,141,317 A | 10/2000 | Marchok et al. | |
| 6,148,024 A | 11/2000 | Ho et al. | |
| 6,154,839 A | 11/2000 | Arrow et al. | |
| 6,185,251 B1 | 2/2001 | Fertner | |
| 6,185,257 B1 | 2/2001 | Moulsley | |
| 6,212,635 B1 | 4/2001 | Reardon | |
| 6,259,729 B1 | 7/2001 | Seki | |
| 6,266,367 B1 | 7/2001 | Strait | |
| 6,272,108 B1 | 8/2001 | Chapman | |
| 6,279,022 B1 | 8/2001 | Miao et al. | |
| 6,285,654 B1 | 9/2001 | Marchok et al. | |
| 6,308,213 B1 | 10/2001 | Valencia | |
| 6,320,902 B1 | 11/2001 | Nafie et al. | |
| 6,347,237 B1 | 2/2002 | Eden et al. | |
| 6,353,629 B1 | 3/2002 | Pal | |
| 6,353,630 B1 | 3/2002 | Schreib | |
| 6,370,156 B2 | 4/2002 | Spruyt et al. | |
| 6,466,557 B1 | 10/2002 | Doi | |
| 6,473,394 B1 | 10/2002 | Marchok et al. | |
| 6,487,252 B1 | 11/2002 | Kleider et al. | |
| 6,487,598 B1 | 11/2002 | Valencia | |
| 6,526,105 B1 | 2/2003 | Harikumar et al. | |
| 6,529,868 B1 | 3/2003 | Chandran et al. | |
| 6,557,037 B1 | 4/2003 | Provino | |
| 6,631,175 B2 | 10/2003 | Harikumar et al. | |
| 6,654,429 B1 | 11/2003 | Li | |
| 6,690,680 B1 | 2/2004 | Marchok et al. | |
| 6,765,881 B1 | 7/2004 | Rajakarunanayake | |
| 6,771,590 B1 | 8/2004 | Marchok et al. | |
| 6,772,332 B1 | 8/2004 | Boebert et al. | |
| 6,804,192 B1 | 10/2004 | Marchok et al. | |
| 6,912,194 B1 | 6/2005 | Marchok et al. | |
| 6,948,076 B2 | 9/2005 | Saito | |
| 6,950,388 B2 | 9/2005 | Marchok et al. | |
| 7,010,608 B2 | 3/2006 | Garg et al. | |
| 7,032,242 B1 | 4/2006 | Grabelsky et al. | |
| 7,058,572 B1 | 6/2006 | Nemer | |
| 7,096,182 B2 | 8/2006 | Chandran et al. | |
| 7,254,178 B2 | 8/2007 | Harikumar et al. | |
| 7,369,990 B2 | 5/2008 | Nemer | |
| 7,424,424 B2 | 9/2008 | Chandran et al. | |
| 7,430,242 B2 * | 9/2008 | Harikumar et al. | 375/260 |
| 7,440,498 B2 | 10/2008 | Harikumar et al. | |
| 7,613,102 B2 | 11/2009 | Marchok et al. | |
| 7,616,553 B2 | 11/2009 | Marchok et al. | |
| 2001/0020241 A1 | 9/2001 | Kawamoto et al. | |
| 2001/0040920 A1 * | 11/2001 | Nafie et al. | 375/229 |
| 2002/0007454 A1 | 1/2002 | Tarpenning et al. | |
| 2002/0078379 A1 | 6/2002 | Edwards et al. | |
| 2002/0098795 A1 | 7/2002 | Brede et al. | |
| 2002/0147791 A1 | 10/2002 | Choi | |
| 2003/0040908 A1 | 2/2003 | Yang et al. | |
| 2003/0128752 A1 | 7/2003 | Harikumar et al. | |
| 2003/0196087 A1 | 10/2003 | Stringer et al. | |
| 2004/0091056 A1 | 5/2004 | Harikumar et al. | |
| 2004/0184484 A1 | 9/2004 | Marchok et al. | |
| 2004/0240669 A1 | 12/2004 | Kempf et al. | |
| 2004/0246890 A1 | 12/2004 | Marchok et al. | |
| 2006/0034166 A1 | 2/2006 | Marchok et al. | |
| 2006/0229869 A1 | 10/2006 | Nemer | |
| 2007/0033642 A1 | 2/2007 | Ganesan et al. | |
| 2007/0110096 A1 | 5/2007 | Geile et al. | |
| 2008/0144487 A1 | 6/2008 | Marchok et al. | |

| | | | |
|---|---|---|---|
| 2008/0144731 A1 | 6/2008 | Marchok et al. | |
| 2008/0298483 A1 | 12/2008 | Marchok et al. | |
| 2009/0003421 A1 | 1/2009 | Harikumar et al. | |
| 2009/0024387 A1 | 1/2009 | Chandran et al. | |

FOREIGN PATENT DOCUMENTS

| | | |
|---|---|---|
| EP | 1 017 206 A2 | 7/2000 |
| JP | 10-504168 A | 4/1998 |
| JP | 11-203248 A | 7/1999 |
| JP | 2001-134534 A | 5/2001 |
| JP | 2001-237818 A | 8/2001 |
| WO | WO 87/00366 | 1/1987 |
| WO | WO 93/26096 | 12/1993 |
| WO | WO 95/15550 | 6/1995 |
| WO | WO 99/52250 A2 | 10/1999 |
| WO | WO 00/41169 | 7/2000 |
| WO | WO 00/49755 A2 | 8/2000 |
| WO | WO 01/73760 A1 | 10/2001 |

OTHER PUBLICATIONS

Whittle, "The Optus Vision: Telephony, Internet, and Video," *Australian Communications*, 7 pages (1996).

"Cablespan 2300," Training Presentation, Tellabs, Inc., pp. 1-17 (1996).

Moose, "A Technique for Orthogonal Frequency Division Multiplexing Frequency Offset Correction," *IEEE Transactions on Communications*, vol. 42, No. 10 (1994).

Jacobsen, et al., "Synchronized DMT for Multipoint-to-point Communications on HFC Networks," *Information Systems Laboratory, IEEE Global Communications Conference in Singapore*, pp. 1-10 (1995).

Cimini, "Analysis and Simulation of a Digital Mobile Channel Using Orthogonal Frequency Division Multiplexing," *IEEE Transactions on Communication*, pp. 665-675 (Jul. 1985).

Kennedy et al., "Direction Finding and 'Smart Antennas' Using Software Radio Architectures," *IEEE Communications Magazine*, pp. 62-68 (May 1995).

Paulraj, "Antenna Array Signal Processing with Applications to Mobile Communications," *Second Workshop on Smart Antennas in Wireless Mobile Communications*, Stanford University, Stanford, CA 94305, (Jul. 1995) pp. 1-120.

Russell et al., "Terrestrial Digital Video Broadcasting for Mobile Reception using OFDM," *Wireless Personal Communications*, 2: 45-66 (1995).

Swales et al., "The Performance Enhancement of Multi-Beam Adaptive Base-Station Antennas for Cellular Land Mobile Radio Systems," *IEEE Transactions on Vehicular Technology*, 39(1): 56-77 (Feb. 1990).

"Guide to Choosing a Wireless Base Station Antenna System," pp. 7-11 (date unknown).

IEEE Transactions on Acoustics, Speech and Signal Processing, vol. 28, No. 2, Apr. 1980, pp. 137-145, "Speech Enhancement Using a soft-Decision Noise Suppression Filter," Robert J. McCaulay and Marilyn L. Malpass.

IEEE Conference on Acoustics, Speech and Signal Processing, Apr. 1979, pp. 208-211, "Enhancement of Speech Corrupted by Acoustic Noise," M. Berouti, R. Schwartz and J. Makhoul.

Advanced Signal Processing and Digital Noise Reduction, 1996, Chapter 9, pp. 242-260, Saeed V. Vaseght (ISBN Wiley 0471958751).

Proceedings of the IEEE, vol. 67, No. 12, Dec. 1979, pp. 1586-1604, "Enhancement and Bandwidth Compression by Noisy Speech," Jake S. Lim and Alan V. Oppenheim.

Melsa et al., Optimal Impulse Response Shortening, Proceedings of the Thirty-third Annual Allerton Conference on Communication, Control and Computing, pp. 431-439.

Chow et al., "A Cost-Effective Maximum Likelihood Receiver for Multicarrier Systems," Proceedings of the Int'l Conference on Communication, 1992, pp. 333.7.1-333.7.5.

Worthen et al., Simulation of VDSL Test Loops, Technical Report T1E1.4/97-288, ANSI, 1997.

Harikumar et al., "Shortening the channel impulse response of VDSL loops for multicarrier applications," Technical Report T1E1.4/97-289, ANSI 1997.

Harikumar et al., "Minimizing noise bleeding in DMT systems with a TEQ," Technical Report T1E1.4/98-181, ANSI 1998.

Chow et al., A Discrete Multitone Transceiver System for HDSL Applications, IEEE Journal on Selected Areas in Communications, vol. 9, No. 6, Aug. 1991, pp. 895-908.

VDSL Alliance SDMT VDSL Draft Standard Proposal, Technical Report T1E1.4/98-172, ANSI 1998.

DMT Group VDSL PMD Draft Standard Proposal, Technical Report T1E1.4/96-32R2, ANSI 1997.

Very-high-speed Digital Subscriber Lines, Draft Technical Report-Revision 9, T1E1.4/97-131, ANSI 1997.

Cimini, Jr., Analysis and Simulation of a Digital Mobile Channel Using Orthogonal Frequency Division Multiplexing, IEEE Transactions on Communications, vol. COM-33, No. 7, Jul. 1985, pp. 665-675.

Peter J. W. Melsa et al., *Impulse Response Shortening for Discrete Multitone Transceivers*, Dec. 1995, vol. 44, No. 12, IEEE Transactions on Communications.

Naofal Al-Dhahir, *Joint Channel and Echo Impulse Response Shortening on Digital Subscriber Lines*, Oct. 1996, vol. 3, No. 10, IEEE Signal Processing Letters.

D. D. Falconer et al., *Adaptive Channel Memory Truncation for Maximum Likelihood Sequence Estimation*, Nov. 1973, vol. 52, No. 9, The Bell System Technical Journal.

International Preliminary Examination Report, Aug. 13, 1999.

* cited by examiner

SPECTRALLY CONSTRAINED IMPULSE SHORTENING FILTER FOR A DISCRETE MULTI-TONE RECEIVER

CROSS-REFERENCE TO RELATED APPLICATION(S)

This application is a continuation of U.S. Ser. No. 11/759,789, filed on Jun. 7, 2007, now U.S. Pat. No. 7,430,242, which is a continuation of U.S. Ser. No. 10/608,329, filed on Jun. 27, 2003, now U.S. Pat. No. 7,254,178, which is a continuation of U.S. Ser. No. 09/054,468, filed on Apr. 3, 1998, now U.S. Pat. No. 6,631,175.

BACKGROUND

The invention relates to time-domain equalization in a discrete multi-tone (DMT) receiver.

Conventional single carrier modulation techniques translate data bits for transmission through a communication channel by varying the amplitude and/or phase of a single sinusoidal carrier. By contrast, DMT, which is also referred to as Orthogonal Frequency Division Multiplexing (OFDM) or Multicarrier Modulation (MCM), employs a large number of sinusoidal subcarriers, e.g., 128 or 256 subcarriers. The available bandwidth of the communication channel is divided into subchannels and each subchannel communicates a part of the data. A DMT system may employ quadrature amplitude modulation (QAM) for each of the subcarriers.

OFDM-based systems transmit blocks of information bits. The time required to transmit one such block is called the symbol period. The time domain waveform that corresponds to one such block of bits is called a symbol.

Intersymbol interference (ISI) arises from the characteristics of practical communication channels and limits the rate at which information can be transmitted through them. Specifically, communication channels typically have an Effective Discrete-Time Impulse Response (EDIR) that is greater than one sample time in length, which causes ISI. ISI is a well-known phenomenon in single-carrier communication systems and there are many techniques for reducing it. The process of such ISI reduction is called equalization. ISI is discussed, for example, in Proakis, Digital Communications, McGraw Hill, 2nd Edition, 1989.

Equalization in OFDM-based systems is achieved by a two stage process. First, at the transmitter, an end-portion of each symbol is affixed to the beginning of the symbol to form what is called a Cyclic Prefix (CP). A cyclic prefix that is greater than the EDIR of the channel prevents one symbol from interfering with another. Furthermore, it also facilitates a simple method of neutralizing the time-domain spread of each symbol forced by the channel. This is achieved by the use of a simple frequency domain process in the receiver which requires one multiplication operation for each used subcarrier of the OFDM system.

The use of a Cyclic Prefix to reduce ISI is discussed, for example, in: Cimini, "Analysis and Simulation of a Digital Mobile Channel using Orthogonal Frequency Division Multiplexing," IEEE Transactions on communications, pp 665-675 July 1985; Chow, "A Discrete Multi-Tone Transceiver System for HDSL applications," IEEE Journal on Selected Areas of Communications, 9(6):895-908, August 1991; "DMT Group VDSL PMD Draft Standard Proposal," Technical Report, T1E1.4/96-329R2, ANSI 1997.

Another problem arising in conventional DMT systems is noise bleeding, which is the phenomenon of noise in one frequency band interfering with a signal whose subcarrier is in another frequency band. Noise bleeding is caused, in general, by the Discrete Fourier Transform (DFT) operation at the receiver. Noise bleeding is discussed in, for example, Worthen et. al., "Simulation of VDSL Test Loops," Technical Report T1E1.4/97-288, ANSI 1997.

In a perfectly synchronized DMT system, the signal in one frequency band does not interfere with a signal whose subcarrier is in another frequency band. However, noise from one band may interfere with other less noisy bands and render them unusable. Techniques for dealing with noise-bleeding include wavelet-based solutions. However, wavelet-based solutions are, in general, computationally intensive.

SUMMARY

The invention provides a spectrally constrained impulse shortening filter (SCISF) for use, for example, in DMT systems. The SCISF serves two primary functions.

First, the SCISF reduces intersymbol interference (ISI) by reducing the length of the effective discrete-time impulse response (EDIR) of the communication channel. Conventional impulse shortening filters may have deep nulls in their frequency response. By contrast, the SCISF has a filter characteristic that is essentially free from undesired nulls that may attenuate or completely eliminate certain subcarriers.

Second, the SCISF reduces noise bleeding between subchannels by attenuating noisy channels in a manner that does not reduce the signal to noise ratio (SNR) in these channels, but reduces the noise power that may appear in the sidelobes of adjacent subchannels. The SCISF accomplishes these functions by applying a frequency constraint to the signal based on a target spectral response.

In one general aspect, the invention features equalizing a channel in a multiple carrier communication system. The system includes a spectrally constrained impulse shortening filter. Received noise power spectral density is measured. A target spectral response is computed based on the measured noise power. A frequency response for the spectrally constrained impulse shortening filter is selected based on the target spectral response. The communication signal is filtered with the spectrally constrained impulse shortening filter.

Embodiments may include one or more of the following features. The noise power spectral density may be measured at the output of the discrete Fourier transform. The spectrally constrained impulse shortening filter may be a time domain digital filter.

In another aspect, the invention features equalizing a channel in a multiple carrier communication system. The channel has an impulse response and is configured to receive a signal having a cyclic prefix. A target spectral response is computed. The impulse response of the channel is shortened so that a significant part of the energy of the impulse response is confined to a region that is shorter than a target length, and the signal is filtered based on the target spectral response.

The target length may be a length of the cyclic prefix. The target spectral response may be computed from measured noise power density, which may be measured at the output of a discrete Fourier transform. For example, the target spectral response may be the inverse of the measured noise power spectral density. The filtering step may be performed with a filter having a frequency response selected to match the target spectral response. The shortening of the impulse response and/or the filtering may be performed by a time domain digital filter.

In another general aspect, the invention features selecting an impulse response for a spectrally constrained impulse shortening filter in a multiple carrier communication system.

Received noise power spectral density is measured. A cost function is computed using the noise power. The cost function is dependent on the impulse response. The dimensionality of a space over which the cost function is defined is reduced and the cost function is minimized. The noise power spectral density may be measured at the output of a discrete Fourier transform. The cost function may be used to compute coefficients for the spectrally constrained impulse shortening filter.

In another general aspect, the invention features a spectrally constrained impulse shortening filter for a multiple carrier communication system. The system includes a channel that has an impulse response. A digital filter structure receives the signal and apply a frequency characteristic to the signal. The frequency characteristic is determined by filter coefficients. Filter coefficients are selected to shorten the impulse response of the channel so that a significant part of the energy of the impulse response is confined to a region that is shorter than a target length and to apply a frequency characteristic to the signal based on a target spectral response. The selected filter coefficients are input to the taps of the filter.

In another general aspect, the invention features a receiver for receiving a multiple carrier signal from a communication channel having an impulse response. An analog-to-digital converter receives the signal from the communication channel. A spectrally constrained impulse shortening filter receives the signal from the analog-to-digital converter and shortens the impulse response of the channel so that a significant part of an energy of the impulse response is confined to a region that is shorter than a target length. The filter also applies a frequency characteristic to the signal based on a target spectral response. A discrete Fourier transform receives the output of the spectrally constrained impulse shortening filter and a decoder receives outputs of the discrete Fourier transform.

In another aspect, the invention features a modem in which an encoder receives digital data and outputs a constellation of complex values. An inverse discrete Fourier transform receives the constellation from the encoder. A digital-to-analog converter is connected to the inverse discrete Fourier transform and outputs a signal to a communication channel. An analog-to-digital converter receives the signal from the communication channel. A spectrally constrained impulse shortening filter shortens an impulse response of the channel so that a significant part of an energy of the impulse response is confined to a region that is shorter than a target length. The signal is filtered based on a target spectral response. A discrete Fourier transform connected to the filter and a decoder is connected to the discrete Fourier transform and outputs digital data.

In another aspect, the invention features software for causing a processor in a communication system to perform the following operations: measure received noise power spectral density; and compute a target spectral response based on the measured noise power. The software may also include instructions for causing a processor to compute filter coefficients based on the target spectral response.

In another aspect, the invention features software for causing a processor in a communication system to measure received noise power spectral density. A cost function is computed using the noise power. The cost function is dependent on an impulse response of a spectrally constrained impulse shortening filter. The dimensionality of a space over which the cost function is defined is reduced, and the cost function is minimized.

The techniques described here are not limited to any particular hardware or software configuration. They may find applicability in any computing or processing environment that may be used for a communication system. The techniques may be implemented in hardware or software, or a combination of the two. Preferably, the techniques are implemented in computer programs executing on a digital signal processor that includes a processor and a storage medium readable by the processor (including volatile and non-volatile memory).

Other features and advantages will be apparent from the following description, including the drawings and the claims.

DESCRIPTION

Figure 1:
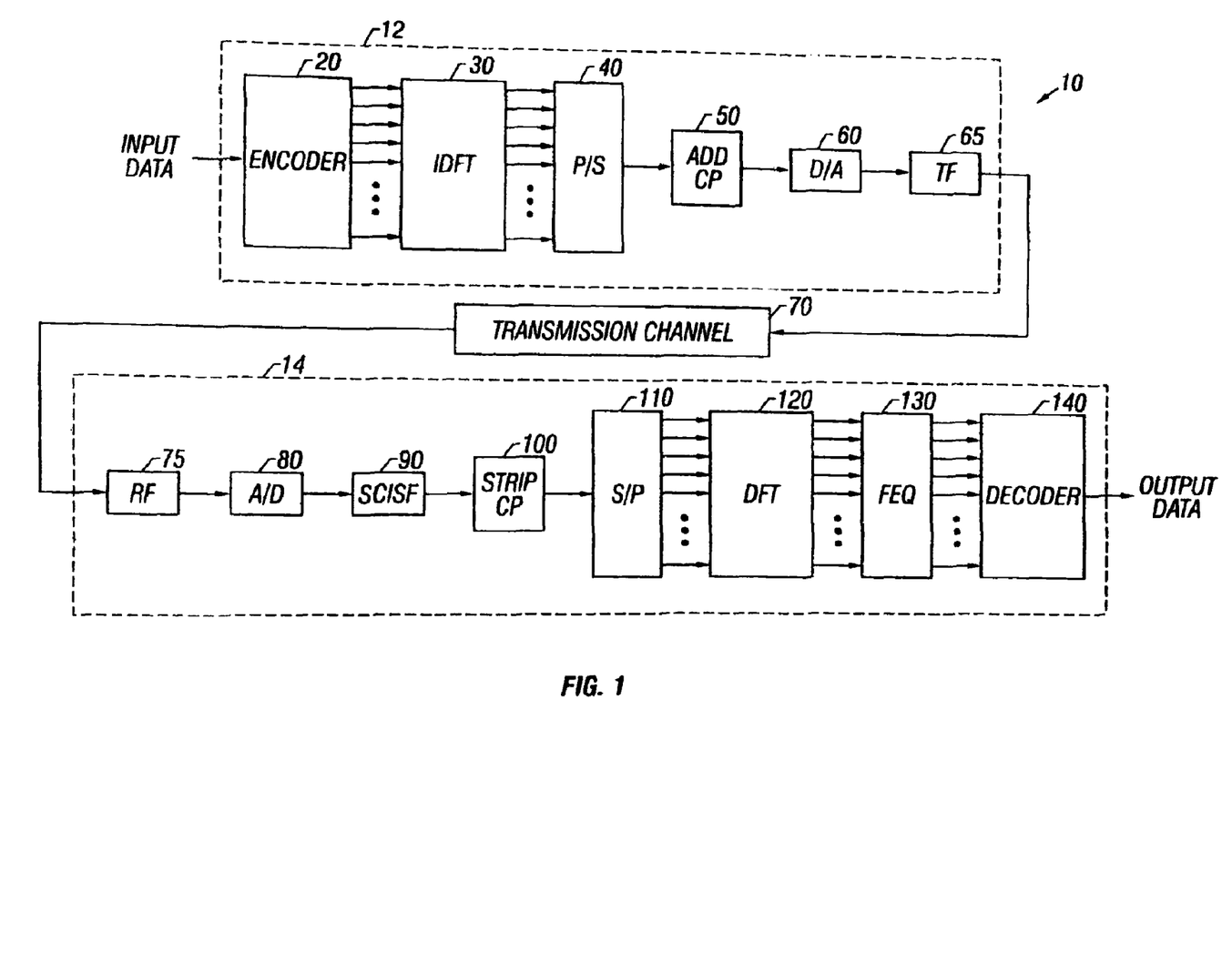
FIG. 1 is a block diagram of a discrete multi-tone communication system.

As shown in FIG. 1, a discrete multi-tone (DMT) communication system 10 has a transmitter 12 and a receiver 14. The transmitter 12 accepts an input data bit stream which passes through a constellation encoder 20. The encoder 20 divides the serial input bit stream into blocks of data. These blocks of data are further subdivided into smaller blocks corresponding to subchannels. Each of these smaller blocks are used to compute a complex value representing a constellation point. Each constellation point corresponds to a subsymbol. The subsymbols are then output by the encoder. Taken together, the subsymbols constitute a symbol.

The subsymbols are supplied to an inverse discrete Fourier transform (IDFT) 30, which may be implemented, for example, in a digital signal processor. The IDFT 30 outputs N time samples of a symbol. The time samples are processed by a parallel to serial converter 40 to form a single stream of time samples.

Following the parallel to serial converter 40, a prefixer 50 adds a cyclic prefix to the beginning of each symbol to reduce intersymbol interference (ISI). Alternatively, the cyclic prefix may be added in the parallel to serial converter. After the cyclic prefix is added, the resulting signal passes through a digital-to-analog (D/A) converter 60 for transmission to the receiver 14 through a communication channel 70. An analog transmit filter 65 may be included following the D/A converter to band limit the transmitted signal.

At the receiver 14, the signal passes through an analog-to-digital (A/D) converter 75 and then through an impulse shortening filter 90. An analog receive filter 85 may be included prior to the A/D converter in order to band limit the received signal. A prefix stripper 100 strips the cyclic prefixes from the resulting symbols and a serial to parallel converter 110 divides the stream of time samples into parallel signal paths that form the inputs to a discrete Fourier transform (DFT) 120. The DFT 120 converts the time samples into subsymbols. A decoder 130 converts the subsymbols into a data bits and outputs the resulting data.

As discussed above, a cyclic prefix is added to each symbol prior to transmission through the communication channel to reduce the effects of ISI. The cyclic prefix is formed by copying the last ν time samples from the end of a symbol and placing them at the beginning of the symbol. To eliminate ISI, the length of the cyclic prefix, ν, is chosen to be longer than the effective discrete-time impulse response (EDIR) of the channel. However, because the cyclic prefix constitutes redundant data, increasing the length of the cyclic prefix reduces the efficiency of the communication system. For example, in a system having N time samples per symbol and a cyclic prefix of ν time samples, the efficiency of the system will be reduced by NI(N+ν). To maximize efficiency it is necessary either to minimize ν or to maximize N. However, increasing N increases the complexity, latency and computational requirements of the system and at some point becomes impractical. Accordingly, it is desirable to minimize ν.

An impulse shortening filter having an impulse response, $g(n)$, may be employed in the receiver to minimize the length of the cyclic prefix by decreasing the EDIR, $g(n)*h(n)$, of the effective communication channel, which includes the transmit and receive filters, the impulse shortening filter and the physical transmission channel. The use of an impulse shortening filter is referred to as time domain equalization. Decreasing the EDIR allows a shorter cyclic prefix to be used without increasing ISI.

Figure 2:
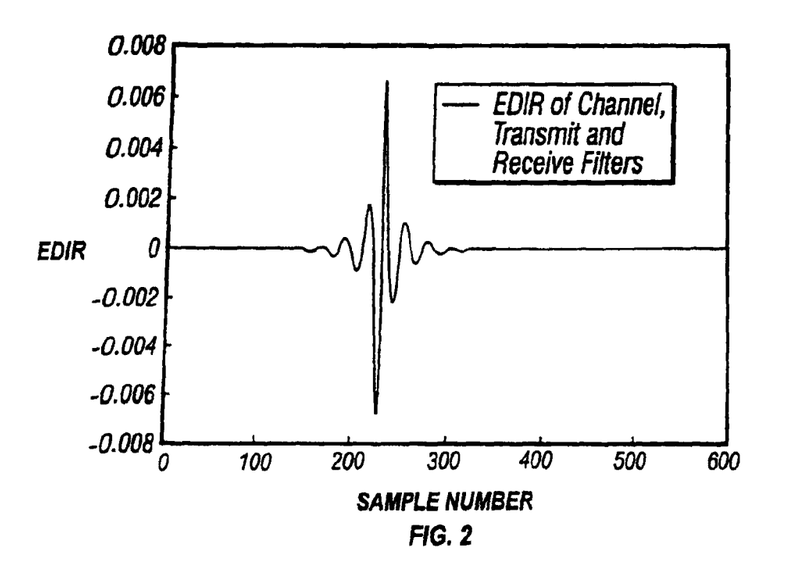
FIG. 2 is a plot of effective discrete-time impulse response (EDIR) of a communication channel including transmit and receive filters.
Figure 3:
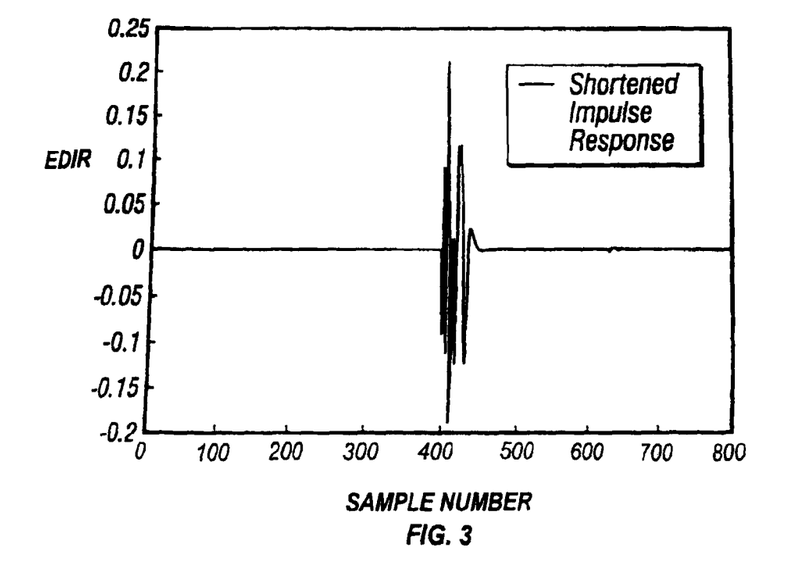
FIG. 3 is a plot of the shortened EDIR due to a spectrally constrained impulse shortening filter (SCISF).

FIG. 2 is a plot of the EDIR for a DMT test configuration having a communication channel that is 4500 feet in length and operates at a sampling frequency of 11.04 MHz (test loop 4, as described in "Very-high Speed Digital Subscriber Lines: System Requirements," *Technical Report T1E1.4/97-131R1*, ANSI 1998). The EDIR includes the effects of a transmit filter, the communication channel and a receive filter. FIG. 3 shows the impulse response as shortened by the addition of an impulse shortening filter.

The impulse shortening filter is selected so that a significant part of the energy of the joint impulse response of the filter and the effective communication channel, $g(n)*h(n)$, is confined to a region that is shorter in length than the length of the cyclic prefix. Some prior algorithms for computing $g(n)$ considered only shortening the EDIR and did not consider the spectral characteristics of the resulting impulse shortening filter. Such filters often had deep nulls in some frequency bands, which rendered some of the corresponding subchannels useless.

Since increasing the length of the cyclic prefix reduces system efficiency, the receiver may dynamically compute an optimal length for the cyclic prefix and may send that information to the transmitter. For example, the receiver may compute a set of impulse responses for the impulse shortening filter based on a set of predetermined cyclic prefix lengths. The receiver then computes the system throughput for each particular cyclic prefix length. The length that maximizes system throughput is selected and the result of that selection is communicated to the transmitter. The transmitter then operates using the selected cyclic prefix length.

To avoid the possible attenuation of frequency bands, the spectral response of the impulse shortening filter is further required to have a spectral response that $|G(\omega)|$, meets a specified spectral constraint. A spectral constraint of the form $|G(\omega)H(\omega)|>\tau$, where $\tau$ is a threshold, is sufficient to avoid nulls in the frequency response of the impulse shortening filter. However, it is possible to compute a spectral constraint or target spectral response, $|G_d(\omega)|$, that provides additional performance improvements, such as reducing noise bleeding between subchannels. A spectrally constrained impulse filter is configured to have a spectral response that approximates the target spectral response.

Figure 4:
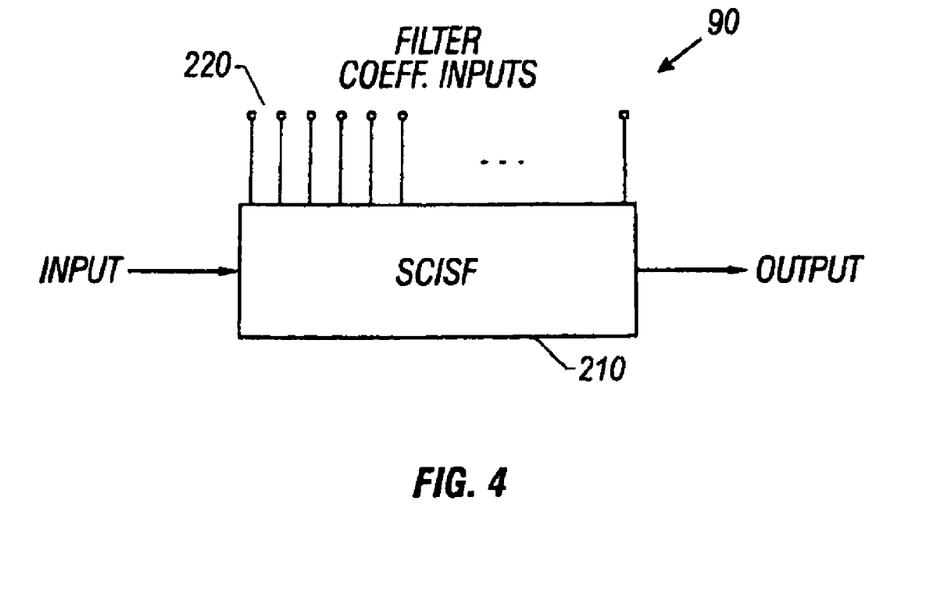
FIG. 4 is a block diagram of a SCISF.

As shown in FIG. 4, the spectrally constrained impulse shortening filter (SCISF) 90 may be implemented as a time domain digital filter, which has a digital filter structure 210 with a number of taps 220 or filter coefficient inputs for adjusting the filter response. The coefficients may be computed and supplied to the taps by a digital signal processor (DSP). Alternatively, the SCISF may be implemented entirely in software, i.e., within a DSP.

A desired spectral response may be applied to a received signal using a filter that is separate from the impulse shortening or time domain equalization (TEQ) filter. For example, an analog filter may be placed prior to the A/D converter. However, the adjustability of such a filter would be limited. As a further example, a digital filter could be added prior to the TEQ filter. Both of these configurations suffer the disadvantage that the TEQ filter may distort the desired spectral characteristics of the added filter. A filter also might be positioned after the TEQ filter, which would reduce noise bleeding, but might reduce the impulse shortening provided by the TEQ filter. Accordingly, the SCISF integrates the TEQ (i.e., impulse shortening) function with the desired spectral response in a single filter.

In summary, the filter characteristic, $g(n)$, of the SCISF satisfies two conditions. First, the effective length of the convolution of the filter characteristic with the impulse response of the communication channel, $g(n)*h(n)$, is less than a target length. Second, the cost function (error function) between the target spectral response, $G_d(\omega)$, and the actual filter spectral response, $G(\omega)$, is minimized.

Figure 5:
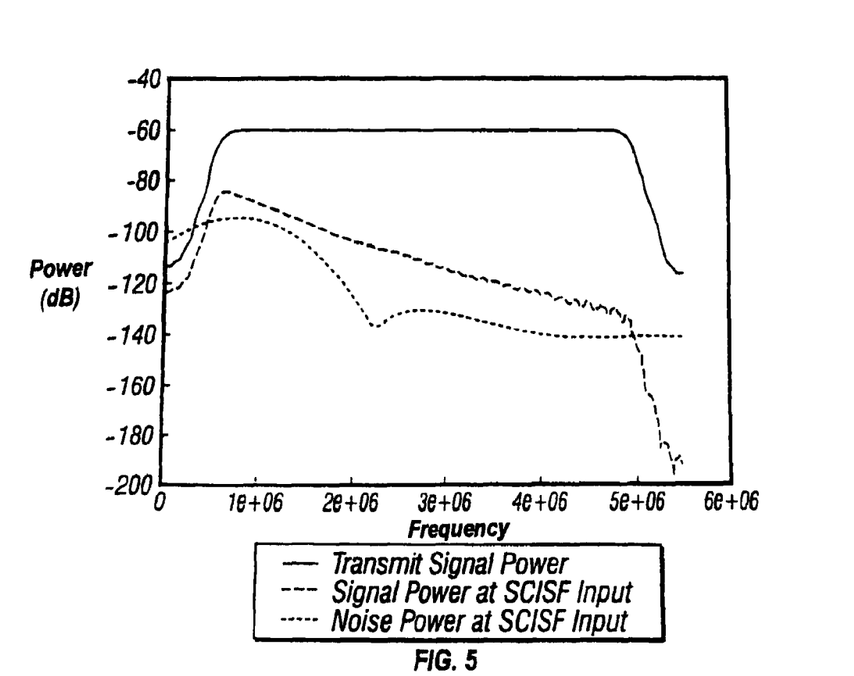
FIG. 5 is a plot of transmit signal power, signal power at SCISF input and noise power at SCISF input.
Figure 6:
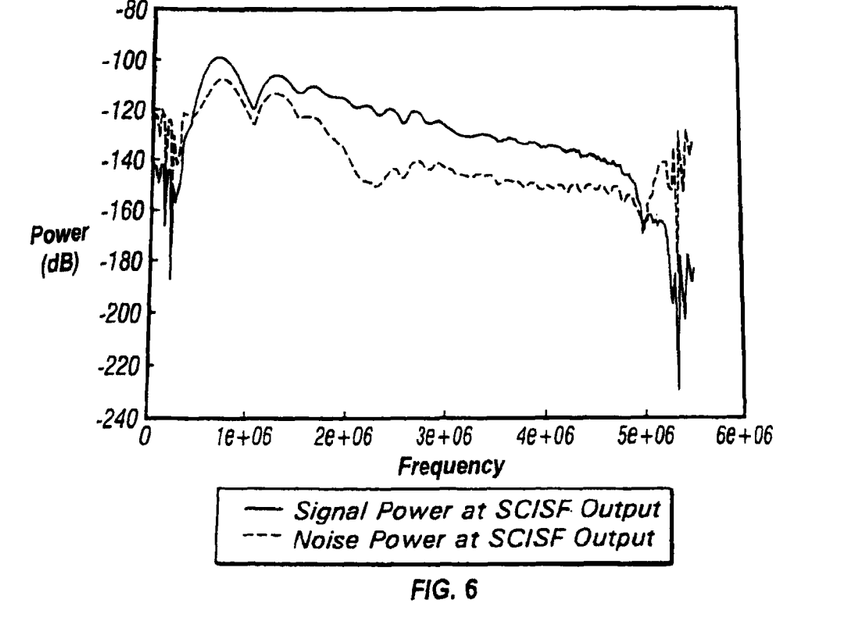
FIG. 6 is a plot of signal and noise power at the output of the SCISF.

The target spectral response is an ideal filter characteristic that is selected to maximize the data bit throughput in the subchannels of a DMT system by reducing the impact of noise. There are many sources for noise in a DMT communication system, such as near-end cross-talk (NEXT), radio frequency interference (RFI) and noise generated in the communication channel (white noise). As shown in FIGS. 5 and 6, the noise spectral density is generally not uniform across the frequency band of the communication system. This non-uniformity contributes to the problem of noise bleeding, in which noise in one frequency band interfering with a signal in another frequency band.

Figure 7:
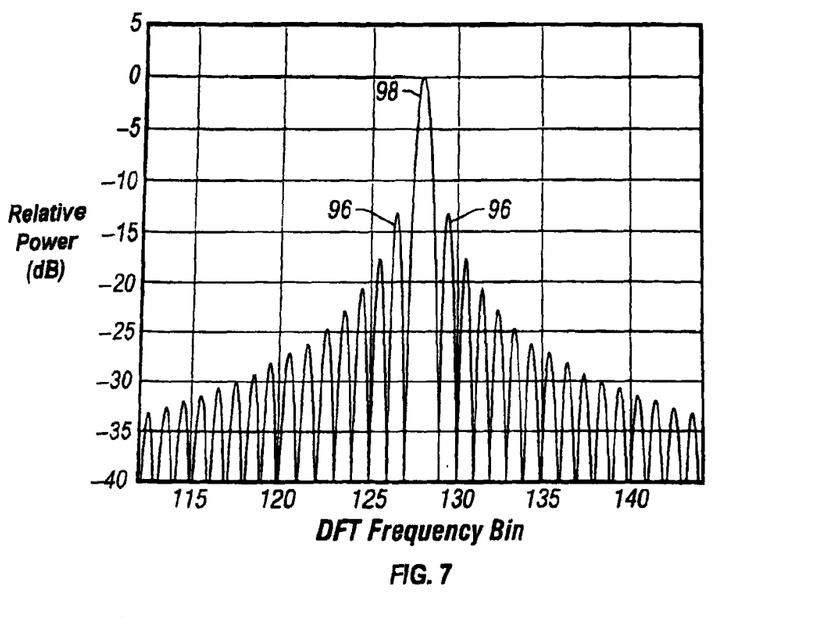
FIG. 7 shows the filter response of a discrete Fourier transform for one frequency band.

In general, noise bleeding is caused by sidelobes of filters in a DFT. FIG. 7 shows the filter response of a DFT for one frequency band or bin (i.e., bin 128). The first sidelobes (250) are only 13 dB below the main lobe (260). Therefore, noise located outside of bin 128, but within the first sidelobe of bin 128, i.e., approximately mid-way between bins 126 and 127, would appear in bin 128 with an attenuation of only 13 dB. Consequently, noisy subchannels in a DMT system may degrade the performance of non-noisy subchannels.

The target spectral response is essentially a spectral constraint that attenuates noisy channels more than non-noisy channels. The signal and noise in the noisy channels are reduced equally, so the attenuation does not affect the signal-to-noise ratio in these channels. However, because the absolute noise level in the noisy channels is reduced, there is less noise available to enter the sidelobes of the non-noisy channels. Hence, the noise bleeding problem is minimized.

To determine the target spectral response, the noise power spectral density (noise PSD) at the receiver must be known. The noise PSD may be determined, for example, by performing a periodigram on received data. This measurement is more complicated if a transmitter is transmitting, since the transmitted signal must be separated from the noise measurement. The noise PSD is determined by: (i) slicing the received constellation of subcarriers after the DFT to determine the nearest valid constellation point; (ii) determining an error signal based on the difference between the received constellation point and the valid constellation point; (iii) performing an IDFT on the error signal; and (iv) generating a periodigram (with windowing) from the error signals. The noise PSD may then be determined from the periodigram.

An example of a noise PSD characteristic for a DMT communication system is shown in FIG. 5 (test loop 4, as described in "Very-high Speed Digital Subscriber Lines; System Requirements," *Technical Report T1E1.4/97-131R1*, ANSI 1998). The transmit signal power is measured at the output of the transmit filter in the transmitter. The signal and noise PSD plots shown in FIG. 5 are measured at the input of the A/D converter in the receiver, which is prior to the SCISF.

Measured noise PSD is used by a digital signal processor (DSP) to compute a target spectral response, $G_d(\omega)$, using the algorithm described below. Alternatively, the inverse of the noise PSD may be used as an approximation for the target spectral response. A spectral response, $G(\omega)$, is then determined for the SCISF that minimizes the error between the spectral response of the SCISF and the target spectral response. A set of filter coefficients may then be generated to configure the SCISF to the determined characteristic. These calculations may be done periodically to adjust the performance of the communication system. Frequency domain equalization coefficients and symbol synchronization may also be adjusted based on these calculations.

Figure 8:
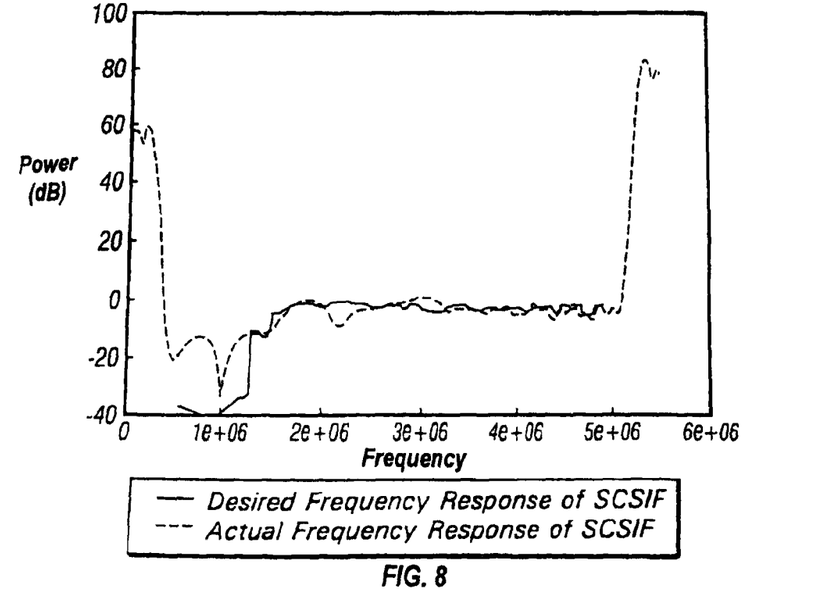
FIG. 8 is a plot of the target spectral response of the SCISF, $G_d(\omega)$, versus the actual frequency response, $G(\omega)$.

FIG. 8 is a plot of the target spectral response of the SCISF, $G_d(\omega)$, versus the actual frequency response, $G(\omega)$. The difference between the responses is only a few dB. FIG. 6 shows the signal and noise PSD at the output of the SCISF.

Figure 9:
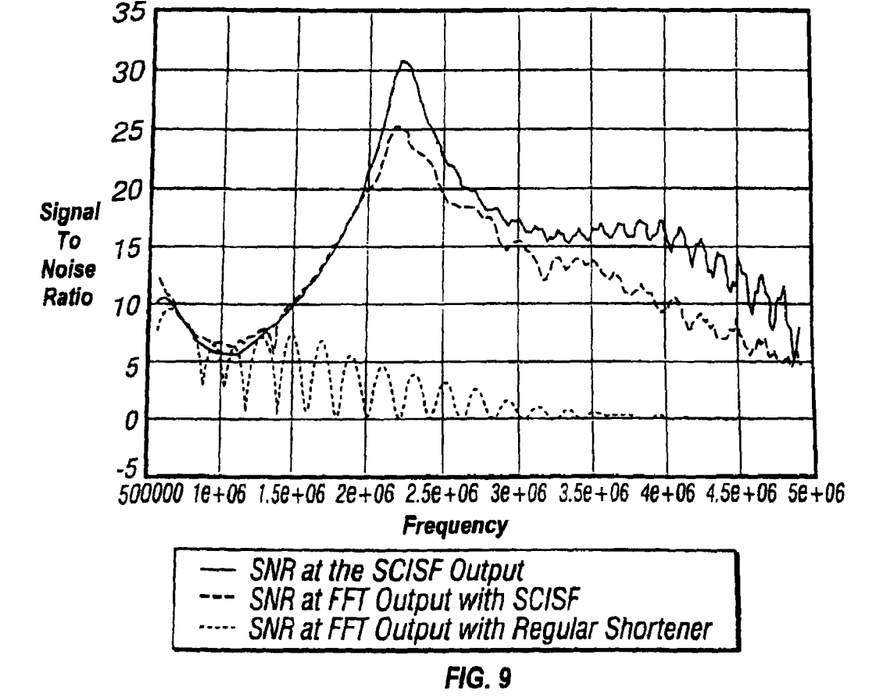
FIG. 9 is a plot of signal-to-noise ratio at the output of the SCISF, the output of the DFT with the SCISF and the output of the DFT without the SCISF.

FIG. 9 shows the dramatic effect of the SCISF on system performance. Without the SCISF (i.e., using a filter that provides only impulse shortening), the signal-to-noise ratio (SNR) decreases significantly at the output of the Fourier transform (i.e., FFT or DFT) to less than about 7 dB. This decrease is due, in large part, to noise bleeding caused by the sidelobes of the Fourier transform. By contrast, with the SCISF, the SNR at the output of the Fourier transform tracks the SNR at the output of the SCISF within a few dB. Overall, the SCISF provides an improvement in SNR.

The target spectral response of the SCISF, $G_d(\omega)$ and the actual frequency response, $G(\omega)$, are derived from an energy constraint for the SCISF, i.e., the target spectral response must localize the energy of the effective impulse response within a desired frequency band. The energy constraint is combined with a desired spectral response based on the measured noise power spectral density. The resulting cost function (or error function) is then minimized to obtain a practical filter characteristic for the SCISF. This process is presented in detail below.

In the following derivation, all vectors are column vectors by default. Vectors are denoted by bold lower case letters (e.g., t). The size $m_t$ of a vector t, is written $t(m_t)$. The components of a vector are denoted by lower case letters, e.g., $t(m_t)=[t_0 \ldots t_{m_t-1}]^T$. The convolution of length $m_t+m_h-1$ of vectors $t(m_t)$ and $h(m_h)$ is denoted t*h. The Toeplitz matrix of a vector $t(m_t) t_{(m:n)} \triangleq [t_m \ldots t_n]^T$, is written $T_{(m:n)}^{m_x}$, and $T_{(m:n)}^m$ x=(t*x)$_{(m:n)}$. The Discrete Time Fourier Transform (DTFT) of a vector t may be represented as:

$$T(\omega) = \sum_{n=0}^{m_t-1} t_n e^{-j\omega n}. \qquad (1)$$

The EDIR of the channel and the impulse response of the SCISF are expressed as $h(m_h)$ and $g (m_g)$, respectively. The cyclic prefix has a length of $m_c$ per symbol. The energy of the effective impulse response must be localized to a contiguous region of target length $m_l$, where $m_l < m_c$, while satisfying a spectral constraint. The energy criterion to be satisfied by the SCISF may be written as:

$$\frac{\|(g*h)_{(m:m+m_l-1)}\|^2}{\|(g*h)\|^2} \geq \alpha \qquad (2)$$

for some $0 \leq m \leq m_g+m_h-2$ and some $0<\alpha<1$. Defining the set $S^m$ as $$S^m = \left\{ g \in R^{m_s} : \frac{\|(g*h)_{(m:m+m_l-1)}\|^2}{\|(g*h)\|^2} \geq \alpha \right\} \qquad (3)$$

impulse response of the SCISF must belong to $S^m$ for some m.

Let $\omega_1, \ldots, \omega_N$ be the location of the sub-carriers in the frequency domain. The spectral constraint may be applied by selecting $g \in S^m$, so that the cost function $$J(g) \triangleq \sum_{i=1}^{N} (|G(\omega_i)| - G_d(\omega_i))^2 \qquad (4)$$

is minimized for the desired target spectral response $G_d(\omega)$.

Typically, this optimization would have to be repeated for all possible m to select the filter impulse response, g, that achieves the lowest possible value of J. However, as discussed below, optimization may be limited to a few well chosen values of m.

The determination of the filter impulse response may be done in two stages. First, the desired magnitude frequency response $G_d(\omega)$ of the impulse shortening filter g over the bins used by the DMT system is obtained. Second, J is optimized over $S^m$ for a specific value of m.

To determine the target spectral response $G_d(\omega)$, it is necessary to use expressions for the signal to noise ratios observed in the various frequency bins at the output of the DFT in the receiver. The DMT system has M tones (subcarriers), N of which (those from $M_1$ through $M_2$) are used, and the communication channel has an analog frequency response $H_c(f)$. The analog noise power spectral density observed at the input of the receiver A/D is $S_n(f)$. Prior to conversion in the A/D converter, the received analog signal may be filtered by an anti-aliasing filter with transfer function $H_a(f)$ The EDIR in the absence of the impulse shortening filter is h(n). After the A/D converter, the signal is fed into the impulse shortening filter with an impulse response of g(n). The impulse shortening filter ensures that (h(n)*g(n)) is shorter in length than the cyclic prefix. $G(\omega)$ is the discrete time Fourier transform of g(n). Under these conditions, the expected signal energy μ(k) observed in bin k at the output of the length-2M receiver DFT is given by:

$$\mu(k) = C_1 D_k \left| H\left(\frac{\pi k}{M}\right) \right|^2 \left| G\left(\frac{\pi k}{M}\right) \right|^2; H(\omega) = H_c\left(\frac{\omega}{2\pi T}\right) H_a\left(\frac{\omega}{2\pi T}\right) \quad (5)$$

where $C_1$ is a constant, 1/T the sampling frequency and $D_k$ the transmitted power in bin k. The noise power η(k) in bin k is:

$$\eta(k) = C_2 \left[ S_\eta\left(\frac{\omega}{2\pi T}\right) |G(\omega)|^2 \left| H_a\left(\frac{\omega}{2\pi T}\right) \right|^2 \right] * \left[ \frac{\sin^2(M\omega)}{\sin^2\left(\frac{\omega}{2}\right)} \right] \Bigg|_{\omega=\frac{\pi k}{M}} \quad (6)$$

where $C_2$ is another constant and * denotes the convolution. Assuming that the noise in the bands corresponding to unused tones is sufficiently attenuated by the anti-alias filter, η(k) is approximately equal to:

$$\eta(k) \approx \quad (7)$$

$$C_3 \sum_{l=M_1}^{M_2} S_\eta\left(\frac{l}{2MT}\right) \left| G\left(\frac{\pi l}{M}\right) \right|^2 \left| H_a\left(\frac{l}{2MT}\right) \right|^2 (\alpha(k-l) + \alpha(2M-k-l)),$$

where α(n) is defined as:

$$\alpha(n) = \int_{-\frac{\pi}{2M}}^{\frac{\pi}{2M}} \left[ \frac{\sin^2\left(M\left(\frac{\pi n}{M} - \lambda\right)\right)}{\sin^2\left(\frac{1}{2}\left(\frac{\pi n}{M} - \lambda\right)\right)} \right] d\lambda, \quad (8)$$

$M_1 \ldots M_2$ are the used tones and $C_3$ another constant. Defining x to be the vector of frequency magnitudes to be solved for as:

$$x \triangleq \begin{bmatrix} \left| G\left(\frac{xM_1}{M}\right) \right|^2 \\ \vdots \\ \left| G\left(\frac{\pi M_2}{M}\right) \right|^2 \end{bmatrix}, \quad (9)$$

the SNR in bin k can be seen to be of the form $$\frac{b_k x_k}{a_k^T x},$$

in which $b_k$ are scalars and $a_k$ are vectors.

To determine the target spectral response, x is chosen to maximize the bit throughput. Approximating the capacity of bin k by $\sqrt{SNR(k)}$, the optimal spectral profile is obtained by minimizing the cost function F, where:

$$F(x) = -\sum_{k=M_1}^{M_2} \sqrt{\frac{b_k x_k}{a_k^T x}}. \quad (10)$$

This minimization is performed over:

$$X = \{x \in R^N : \|x\| = 1, x_i \geq 0, 1 \leq i \leq N\} \quad (11)$$

and can be accomplished by any one of a variety of constrained optimization strategies, as discussed in Bertsekas, *Nonlinear Programming*, Athena Scientific, Belmont, Mass., 1995. A median filter may be applied to the output of the optimization algorithm to smooth the resulting target spectral response.

Let $A \triangleq H_{(0:m_h+m_g-2)}^{m_g}$ and $B \triangleq H_{(m:m+m_1-1)}^{m_g}$. The energy constraint in equation (3) can be written as:

$$S^m = \left\{ g \in R^{m_g} : \frac{g^T B^T B g}{g^T A^T A g} \geq \alpha \right\}. \quad (12)$$

Matrix A has full column rank, since it corresponds to a full convolution, so $R_A \triangleq A^T A$ is invertible. Let $R_B \triangleq B^T B$. Defining $q = R_A^{0.5} h$, where $R_A^{0.5}$ is the square root of the positive definite matrix $R_A$, the energy constraint set can be written in terms of q as:

$$Q \triangleq \left\{ q \in R^{m_g} : \frac{q^T R_A^{-0.5} R_B R_A^{-0.5} q}{q^T q} \geq \alpha \right\}. \quad (13)$$

The next step is to reduce the dimensionality, i.e., the number of variables to search over in the optimization process. For example, in a video digital subscriber line(VDSL) application, an impulse shortening filter having a few hundred taps may be required. Searching over a variable space so large is difficult and impractical. Instead, the optimization is performed by searching over a cleverly chosen lower-dimensional subset of the variable space. This simplification in the optimization process may be done without significant reduction in the performance of the communication system.

The reduction in dimensionality is accomplished by a transformation of variables. Let $C \triangleq R_A^{0.5} R_B R_A^{-0.5}$. Let $S = U \Sigma U^T$ be the singular-value decomposition of C, where Σ is a diagonal matrix whose (i, i)th element is $\sigma_i$ and where the $\sigma_i$ are arranged in descending order. If $\sigma_1 < \alpha$, there is no feasible solution corresponding to delay m. If $\sigma_1 \geq \alpha$, let $$U = [U_1 U_2] \Sigma = \begin{bmatrix} \Sigma_1 & 0 \\ 0 & \Sigma_2 \end{bmatrix}, \quad (14)$$

where $U_1$ has size ($m_g, m_d$) and $\Sigma_1$ has size ($m_d, m_d$) for some $m_d$. These equations define the dimension of the range space of the matrix $U_1$, over which the search is confined. The dimension $m_d$ may be chosen either to include all $\sigma_i$ greater than some threshold β, β<α, or $m_d$ may be a fixed number. Simulations indicate that $m_d$ can be less than $m_g$ by more than an order of magnitude without significantly affecting communication system performance.

The dimensionality reduction is achieved by a further transformation of variables: $q = U_1 \tau$. The energy constraint set now becomes:

$$V \triangleq \left\{ v \in R^{m_d} : \frac{v^T \Sigma_1 v}{v^T v} \geq \alpha \right\} \quad (15)$$

$$= \{ v \in R^{m_d} : v \neq 0, \alpha \|v\|^2 - v^T \Sigma_1 v \leq 0 \}$$

using the identity $U_1^T C U_1 = \Sigma_1$.

Next, the cost function is expressed in terms of v. For a particular v, the corresponding g is given by $g=R_A^{-0.5}U_1v$, which leads to:

$$\begin{bmatrix} G(\omega_1) \\ \vdots \\ G(\omega_N) \end{bmatrix} = Fg; F = \begin{bmatrix} 1 & e^{-j\omega_1} & e^{-j2\omega_1} & \ldots & e^{-j(m_g-1)\omega_1} \\ \vdots & \vdots & \vdots & \vdots & \vdots \\ 1 & e^{-j\omega_N} & e^{-j2\omega_N} & \ldots & e^{-j(m_g-1)\omega_N} \end{bmatrix} \quad (16)$$

Let $D \triangleq FAR_A^{-0.5}U_1$. Let $D^R \triangleq$ real (D) and $D^I \triangleq$ imag(D). $D^R$ and $D^I$ are real matrices of size $(N, m_d)$. Let $d_{R,n}^T$, $1 \leq n \leq N$ and $d_{I,n}^T$, $1 \leq n \leq N$ be the rows of $D^R$ and $D^I$, respectively. Then:

$$|G(\omega_n)| = \sqrt{(d_{R,n}^T v)^2 + (d_{I,n}^T v)^2}$$
$$= \sqrt{v^T (d_{R,n} d_{R,n}^T + d_{I,n} d_{I,n}^T) v}$$
$$= \sqrt{v^T \Gamma_n v}$$

where $\Gamma_n \triangleq d_{R,n} d_{R,n}^T + d_{I,n} d_{I,n}^T$. These definitions result in:

$$J_o(v) \triangleq j(g(v)) = \sum_{n=1}^{N} (\sqrt{v^T \Gamma_n v} - G_d(\omega_n))^2 \quad (17)$$

The gradient and Hessian of $J_o$ are:

$$\nabla_{J_o}(v) = \sum_{n=1}^{N} 2\left(1 - \frac{G_d(\omega_n)}{\sqrt{v^T \Gamma_n v}}\right) \Gamma_n v \quad (18)$$

$$H_{J_o}(v) = \sum_{n=1}^{N} 2\left[\left(1 - \frac{G_d(\omega_n)}{\sqrt{v^T \Gamma_n v}}\right) \Gamma_n + \frac{G_d(\omega_n)}{(\sqrt{v^T \Gamma_n v})^3} \Gamma_n v v^T \Gamma_n\right] \quad (19)$$

The projection $P_v(y)$ of any $y \in R^{md}$ on to V is defined to be $$P_V(y) \triangleq \underset{v \in V}{\arg\min} \|y - v\|^2 \quad (20)$$

To develop an algorithm to optimize the cost function $J_o$ over V, an expression must be derived for $P_v(y)$. There is no closed-form expression for this projection operator, however there is a very efficient algorithm to compute it. If $y \in V$, $P_v(y)=y$. If not, the projection onto V is the same as the projection on to its boundary, defined by:

$$\text{boundary}(V) \triangleq \{v \in R^{md} : v \neq 0, \alpha\|v\|^2 - v^T \Sigma_1 v = 0\} \quad (21)$$

The latter may be accomplished using LaGrange multipliers as follows. Defining a modified cost function S as:

$$s(v) \triangleq \|y-v\|^2 + \mu(\alpha\|v\|^2 - v^T \Sigma_1 v) \quad (22)$$

The equation $\nabla_S(v)=0$ must be solved on the boundary of V. This reduces to the following simultaneous equations:

$$[(1+\mu\alpha)I - \mu\Sigma_1]v = 0 \quad (23)$$

$$\alpha\|v\|^2 - v^T \Sigma_1 v = 0 \quad (24)$$

Solving for v in terms of µ m (23) and substituting in (24), the following equation is obtained for µ:

$$y^T \text{diag}\left(\frac{\alpha - \sigma_i}{[1 + \mu(\alpha - \sigma_i)]^2}\right) y = 0 \quad (25)$$

Equation (25) may be written as a polynomial equation of order $2m_d$ in µ. The polynomial equation must be solved for the real and positive roots, which may be done using one of the variety of efficient root-finding algorithms in the literature. One of the real, positive roots must be chosen by enumeration so that, when substituted into the expression for v, it leads to the smallest $\|y-v\|^2$.

Since the gradient and Hessian of the cost function $J_o$ and the projection operator onto V are available, the optimization can be done very efficiently. For example, the penalty method may be used, as described in Bertsekas, *Nonlinear Programming*, Athena Scientific, Belmont, Mass., 1995, or an iterative strategy consisting of gradient descent followed by projection onto V. Both techniques have been tested and perform well.

Other embodiments are within the scope of the following claims.

What is claimed is:

1. A spectrally constrained impulse shortening filter for a multiple carrier communication system, the system being configured to receive a signal and includes a channel that has an impulse response, the filter comprising:
  a digital filter structure configured to apply a frequency characteristic to the signal, the frequency characteristic being determined by filter coefficients; and taps coupled to the digital filter structure, wherein the filter coefficients being selected to shorten the impulse response of the channel so that a significant part of an energy of the impulse response is confined to a region that is shorter than a length of a cyclic prefix of the signal.

2. The filter of claim 1 wherein the filter coefficients are selected to apply a frequency characteristic to the signal based on a target spectral response having a magnitude constraint that is based on measured noise power spectral density.

3. The filter of claim 2, wherein the noise power spectral density is measured at an output of a discrete Fourier transform coupled to receive an output of the spectrally constrained impulse shortening filter.

4. A receiver for receiving a multiple carrier signal from a communication channel having an impulse response, the receiver comprising:
  an analog-to-digital converter configured to receive the signal from the communication channel; and
  a spectrally constrained impulse shortening filter coupled to the analog-to-digital converter and configured to shorten the impulse response of the channel so that a significant part of an energy of the impulse response is confined to a region that is shorter than a length of a cyclic prefix of the received signal.

5. The receiver of claim 4 comprising:
  a discrete Fourier transform coupled to receive an output of the spectrally constrained impulse shortening filter; and
  a decoder coupled to receive an output of the discrete Fourier transform.

6. The receiver of claim 5 wherein the spectrally constrained impulse shortening filter is configured to apply a frequency characteristic to the signal based on a target spectral response having a magnitude constraint that is based on measured noise power spectral density to reduce noise bleeding from the channel to adjacent channels.

7. The receiver of claim 6 wherein the target spectral response is computed from measured noise power spectral density.

8. The receiver of claim 7 wherein the target spectral response is approximated by the inverse of the measured noise power spectral density.

9. The receiver of claim 6 wherein the noise power spectral density is measured at an output of a discrete Fourier transform.

10. The receiver of claim 6 wherein the applied frequency characteristic causes attenuation of noise and signal components in the channel substantially equally.

11. A modem comprising:
an encoder arranged to receive digital data and output a constellation of complex values;
an inverse discrete Fourier transform arranged to receive the constellation;
a digital-to-analog converter coupled to the inverse discrete Fourier transform and arranged to output a signal to a communication channel;
an analog-to-digital converter arranged to receive the signal; and
a spectrally constrained impulse shortening filter coupled to the analog-to-digital converter and arranged to shorten an impulse response of the channel so that a significant part of an energy of the impulse response is confined to a region that is shorter than a length of a cyclic prefix of the received signal.

12. The modem of claim 11 comprising:
a discrete Fourier transform coupled to receive an output of the spectrally constrained impulse shortening filter; and
a decoder coupled to the discrete Fourier transform and arranged to output digital data.

13. The modem of claim 12 wherein the spectrally constrained impulse shortening filter is arranged to filter the signal based on a target spectral response having a magnitude constraint that is based on measured noise power spectral density.

14. The modem of claim 13 wherein the noise power spectral density is measured at an output of the discrete Fourier transform.

15. A receiver for receiving a multiple carrier signal from a communication channel having an impulse response, the receiver comprising:
an analog-to-digital converter coupled to receive the signal from the communication channel; and
a spectrally constrained impulse shortening filter coupled to the analog-to-digital converter and configured to (1) measure received noise power spectral density, (2) compute a cost function using the noise power, the cost function being dependent on the impulse response, (3) reduce the dimensionality of a space over which the cost function is defined and (4) minimize the cost function.

16. A receiver for receiving a multiple carrier signal from a communication channel having an impulse response, the receiver comprising:
an analog-to-digital converter configured to receive the signal from the communication channel; and
a spectrally constrained impulse shortening filter coupled to receive the signal from the analog-to-digital converter and configured to (1) measure received noise power spectral density, (2) compute a target spectral response having a: magnitude constraint that is based on the measured noise power spectral density and (3) select a frequency response of the spectrally constrained impulse shortening filter based on the target spectral response.

17. The receiver of claim 16 wherein the target spectral response is computed from measured noise power spectral density.

18. The receiver of claim 16, wherein the target spectral response is approximated by the inverse of the measured noise power spectral density.

19. A modem comprising:
a digital-to-analog converter arranged to output a signal to a communication channel;
an analog-to-digital converter arranged to receive the signal; and
a spectrally constrained impulse shortening filter coupled to the analog-to-digital converter and configured to (1) measure received noise power spectral density, (2) compute a cost function using the noise power, the cost function being dependent on the impulse response, (3) reduce the dimensionality of a space over which the cost function is defined and (4) minimize the cost function.

20. The modem of claim 19 comprising:
an encoder arranged to receive digital data and output a constellation of complex values; and
an inverse discrete Fourier transform arranged to receive the constellation;
wherein the inverse discrete Fourier transform is coupled to the analog-to-digital converter.

21. The modem of claim 19 comprising:
a discrete Fourier transform arranged to receive an output of the spectrally constrained impulse shortening filter; and
a decoder coupled to the discrete Fourier transform and arranged to output digital data.

22. The modem of claim 21 wherein the noise power spectral density is measured at an output of the discrete Fourier transform.

23. A modem comprising:
an encoder arranged to receive digital data and output a constellation of complex values;
an inverse discrete Fourier transform coupled to receive the constellation;
a digital-to-analog converter coupled to the inverse discrete Fourier transform and arranged to output a signal to a communication channel;
an analog-to-digital converter arranged to receive the signal; and
a spectrally constrained impulse shortening filter couple to the analog-to-digital converter and configured to (1) measure received noise power spectral density, (2) compute a target spectral response having a magnitude constraint that is based on the measured noise power spectral density and (3) select a frequency response of the spectrally constrained impulse shortening filter based on the target spectral response.

24. A receiver for receiving a multiple carrier signal from a communication channel having an impulse response, the receiver comprising a spectrally constrained impulse shortening filter coupled to an analog-to-digital converter and configured to shorten the impulse response of the channel so that a significant part of an energy of the impulse response is confined to a region that is shorter than a length of a cyclic prefix of the signal.

* * * * *

UNITED STATES PATENT AND TRADEMARK OFFICE
CERTIFICATE OF CORRECTION

PATENT NO. : 8,102,928 B2
APPLICATION NO. : 12/238140
DATED : January 24, 2012
INVENTOR(S) : Gopal Harikumar and Daniel J. Marchok It is certified that error appears in the above-identified patent and that said Letters Patent is hereby corrected as shown below:

In Column 14, Claim 23, line 47 delete "couple" and insert --coupled--

Signed and Sealed this
Twenty-ninth Day of May, 2012

David J. Kappos
*Director of the United States Patent and Trademark Office*